United States Patent
Hunt et al.

(10) Patent No.: US 11,102,290 B2
(45) Date of Patent: *Aug. 24, 2021

(54) PEER-TO-PEER NETWORK PRIORITIZING PROPAGATION OF OBJECTS THROUGH THE NETWORK

(71) Applicant: Microsoft Technology Licensing, LLC, Redmond, WA (US)

(72) Inventors: Brandon T. Hunt, Redmond, WA (US); Alexander Burba, Seattle, WA (US); Frank R. Morrison, III, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 41 days.

This patent is subject to a terminal disclaimer.

(21) Appl. No.: 16/149,935

(22) Filed: Oct. 2, 2018

(65) Prior Publication Data

US 2019/0037015 A1 Jan. 31, 2019

Related U.S. Application Data

(63) Continuation of application No. 14/141,737, filed on Dec. 27, 2013, now Pat. No. 10,116,740.

(51) Int. Cl.
*H04L 29/08* (2006.01)

(52) U.S. Cl.
CPC ........ *H04L 67/1055* (2013.01); *H04L 67/108* (2013.01); *H04L 67/1085* (2013.01)

(58) Field of Classification Search
CPC ............... H04L 67/1055; H04L 67/108; H04L 67/1085

See application file for complete search history.

(56) References Cited

U.S. PATENT DOCUMENTS 7,404,002 B1 * 7/2008 Pereira ................ H04L 12/1854
709/203
7,818,407 B2 10/2010 O'Neal et al.
(Continued)

FOREIGN PATENT DOCUMENTS

CN 1719833 A 1/2006
CN 101431469 A 5/2009
(Continued)

OTHER PUBLICATIONS

"P2P", In China Academic Journal Electronic Publishing House, Jul. 9, 2012, pp. 53-57.

(Continued)

*Primary Examiner* — Jerry B Dennison

(57) ABSTRACT

A method for transferring digital content items in a peer-to-peer network in which a plurality of nodes participate includes receiving requests for receipt of one or more digital content items from a plurality of requesting nodes belonging to the peer-to-peer network. A capacity of the requesting nodes to upload data is assessed. Network resources available to the peer-to-peer network for delivering the digital content items or chunks thereof to the receiving nodes are allocated based at least in part on the capacity of the requesting nodes to upload data. The digital content items or chunks thereof are sent to the requesting nodes over the peer-to-peer network in accordance with the network resources that are allocated to each of the requesting nodes.

20 Claims, 3 Drawing Sheets

(56) References Cited

U.S. PATENT DOCUMENTS

| | | | |
|---|---|---|---|
| 7,849,196 B2* | 12/2010 | Gkantsidis | H04L 67/06 709/227 |
| 8,458,333 B1* | 6/2013 | Stoica | H04L 67/101 709/226 |
| 8,477,658 B2 | 7/2013 | Tsang et al. | |
| 9,313,160 B1* | 4/2016 | Shamis | H04L 51/16 |
| 10,303,684 B1* | 5/2019 | Kurihara | G06F 16/2453 |
| 2005/0091399 A1 | 4/2005 | Candan et al. | |
| 2006/0034334 A1* | 2/2006 | Biederman | H04L 47/70 370/477 |
| 2006/0080454 A1 | 4/2006 | Li | |
| 2007/0028133 A1* | 2/2007 | Izutsu | H04L 67/06 714/4.11 |
| 2007/0094325 A1 | 4/2007 | Ih et al. | |
| 2008/0005113 A1 | 1/2008 | Li | |
| 2008/0133767 A1 | 6/2008 | Birrer et al. | |
| 2008/0209053 A1* | 8/2008 | Shen | H04L 67/1055 709/228 |
| 2008/0235391 A1* | 9/2008 | Painter | H04N 21/4622 709/232 |
| 2008/0235746 A1* | 9/2008 | Peters | H04N 21/6168 725/111 |
| 2009/0182815 A1* | 7/2009 | Czechowski, III | H04L 67/1076 709/206 |
| 2009/0198829 A1* | 8/2009 | Sengupta | H04L 65/607 709/233 |
| 2009/0249222 A1* | 10/2009 | Schmidt | H04L 51/32 715/751 |
| 2009/0265473 A1 | 10/2009 | Hydrie et al. | |
| 2009/0287821 A1 | 11/2009 | Luzzatti et al. | |
| 2010/0011103 A1 | 1/2010 | Luzzatti et al. | |
| 2010/0302944 A1* | 12/2010 | Bessis | H04L 47/125 370/235 |
| 2011/0060798 A1 | 3/2011 | Cho et al. | |
| 2011/0131278 A1 | 6/2011 | Nieh et al. | |
| 2011/0282989 A1* | 11/2011 | Geirhofer | H04W 8/005 709/224 |
| 2011/0289218 A1 | 11/2011 | Luzzatti et al. | |
| 2012/0303764 A1* | 11/2012 | Ibenforth | H04L 67/1002 709/219 |
| 2013/0110931 A1 | 5/2013 | Kim et al. | |
| 2013/0132602 A1* | 5/2013 | El-Beltagy | H04L 67/1063 709/231 |
| 2013/0174237 A1* | 7/2013 | Zises | G06F 21/32 726/7 |
| 2013/0283285 A1* | 10/2013 | Zhou | G06F 9/4881 718/103 |
| 2013/0332533 A1* | 12/2013 | Ramankrishnan | H04L 67/1078 709/204 |
| 2014/0172979 A1* | 6/2014 | El-Beltagy | H04L 67/1063 709/204 |
| 2014/0280563 A1* | 9/2014 | El-Beltagy | H04L 67/1076 709/204 |
| 2015/0189011 A1* | 7/2015 | Hunt | H04L 67/108 709/219 |
| 2016/0234303 A1* | 8/2016 | Liu | H04L 67/104 |

FOREIGN PATENT DOCUMENTS

| | | |
|---|---|---|
| CN | 103973740 A | 8/2014 |
| EP | 1615403 A1 | 1/2006 |

OTHER PUBLICATIONS

"Study on Incentive Mechanism of Peer-to-Peer Applications based on Gnutella Protocol", In Shandong University Masters Thesis, Apr. 5, 2009, 27 Pages.

"Final Office Action Issued in U.S. Appl. No. 14/141,737", dated Aug. 29, 2016, 9 Pages.

"Final Office Action Issued in U.S. Appl. No. 14/141,737", dated Jul. 28, 2015, 13 Pages.

"Non Final Office Action Issued in U.S. Appl. No. 14/141,737", dated Apr. 12, 2017, 8 Pages.

"Non Final Office Action Issued in U.S. Appl. No. 14/141,737", dated Dec. 30, 2015, 13 Pages.

"Non Final Office Action Issued in U.S. Appl. No. 14/141,737", dated Feb. 11, 2015, 13 Pages.

"Office Action Issued in Chinese Patent Application No. 201480071243.2", dated Jun. 27, 2018, 15 Pages.

Legout, et al., "Clustering and Sharing Incentives in BitTorrent Systems", In Proceedings of ACM SIGMETRICS Performance Evaluation Review, vol. 35, Issue 1, Jun. 12, 2007, pp. 301-312.

Legout, et al., "Rarest First and Choke Algorithms Are Enough", In Proceedings of the fith ACM SIGCOMM Conference on Internet Measurement, Oct. 25, 2006, pp. 203-216.

Liu, et al., "Understanding and Improving Ratio Incentives in Private P2P Communities", In IEEE 30th International Conference on Distributed Computing Systems, Jun. 21, 2010, pp. 610-621.

"International Preliminary Report on Patentability Issued in PCT Patent Application No. PCT/US2014/071775", dated Feb. 22, 2016, 7 Pages.

"International Search Report and Written Opinion Issued in PCT Application No. PCT/US2014/071775", dated Mar. 19, 2015, 8 Pages.

"Second Written Opinion Issued in Patent Application No. PCT/US2014/071775", dated Dec. 1, 2015, 5 Pages.

Rongsheng, MA, "A Study of Resource Scheduling and Its Distributing Strategies in P2P Transmission", In Journal of Liuzhou Teachers College, vol. 26, No. 2, Apr. 2011, pp. 127-130.

Sherman, et al., "FairTorrent: Bringing Fairness to Peer-to-Peer Systems", In Proceedings of the 5th international conference on Emerging networking experiments and technologies, Dec. 1, 2009, pp. 133-144.

Shin, et al., "Treat-Before-Trick: Free-riding Prevention for BitTorrent-like Peer-to-Peer Networks", In IEEE International Symposium on Parallel & Distributed Processing, pp. 1-12.

Yang, et al., "GPS: A General Peer-to-Peer Simulator and its Use for Modeling BitTorrent", In Proceedings of 13th IEEE International Symposium of Modeling, Analysis, and Simulation of Computer and Telecommunication Systems, Sep. 27, 2005, pp. 425-432.

"Second Office Action Issued in Chinese Patent Application No. 201480071243.2", dated Jan. 16, 2019, 8 Pages.

* cited by examiner

PEER-TO-PEER NETWORK PRIORITIZING PROPAGATION OF OBJECTS THROUGH THE NETWORK

CROSS-REFERENCE TO RELATED APPLICATIONS

This application is a continuation of U.S. Ser. No. 14/141,737, filed Dec. 27, 2013, issued as U.S. Pat. No. 10,116,740, entitled, "PEER-TO-PEER NETWORK PRIORITIZING PROPAGATION OF OBJECTS THROUGH THE NETWORK", which is incorporated herein by reference in its entirety.

BACKGROUND

Content distribution systems have been developed to enable data such as media content, software updates and critical patches to be distributed to nodes in a network. Typically these systems comprise many servers which are placed in the network, with nodes connecting directly to one of the servers to download the required file. However, such systems are constrained by the connection bandwidth to the servers and require considerable investment to increase the capacity of the system. Consequently, alternative distribution systems have been developed which rely on a fully distributed architecture, with nodes in the network participating in the distribution process. Such systems may be referred to as peer-to-peer networks, which provide an infrastructure that enables computing devices to communicate and share information securely with one another. A peer-to-peer networking infrastructure can be effectively employed to improve the efficiency and scalability of content distribution.

In peer-to-peer networks, each computer platform, or node, can operate as a hub, i.e., each node has both client functionality and server functionality. Each node has a list of addresses, most commonly Internet Protocol (IP) addresses, of several other nodes, or "peer nodes". These nodes can directly communicate with each other without a central or intermediate server.

Peer-to-peer networks continue to increase in popularity due to many desirable features, such as adaptation, self-organization, load-balancing, fault-tolerance, low cost, high availability, scalability, and ability to provide a large pool of resources. For example, peer-to-peer networks have emerged as a popular way to share large amounts of data, such as by peers downloading digital content that is referenced as being available for download from another peer in the peer-to-peer network.

SUMMARY

Figure 1:
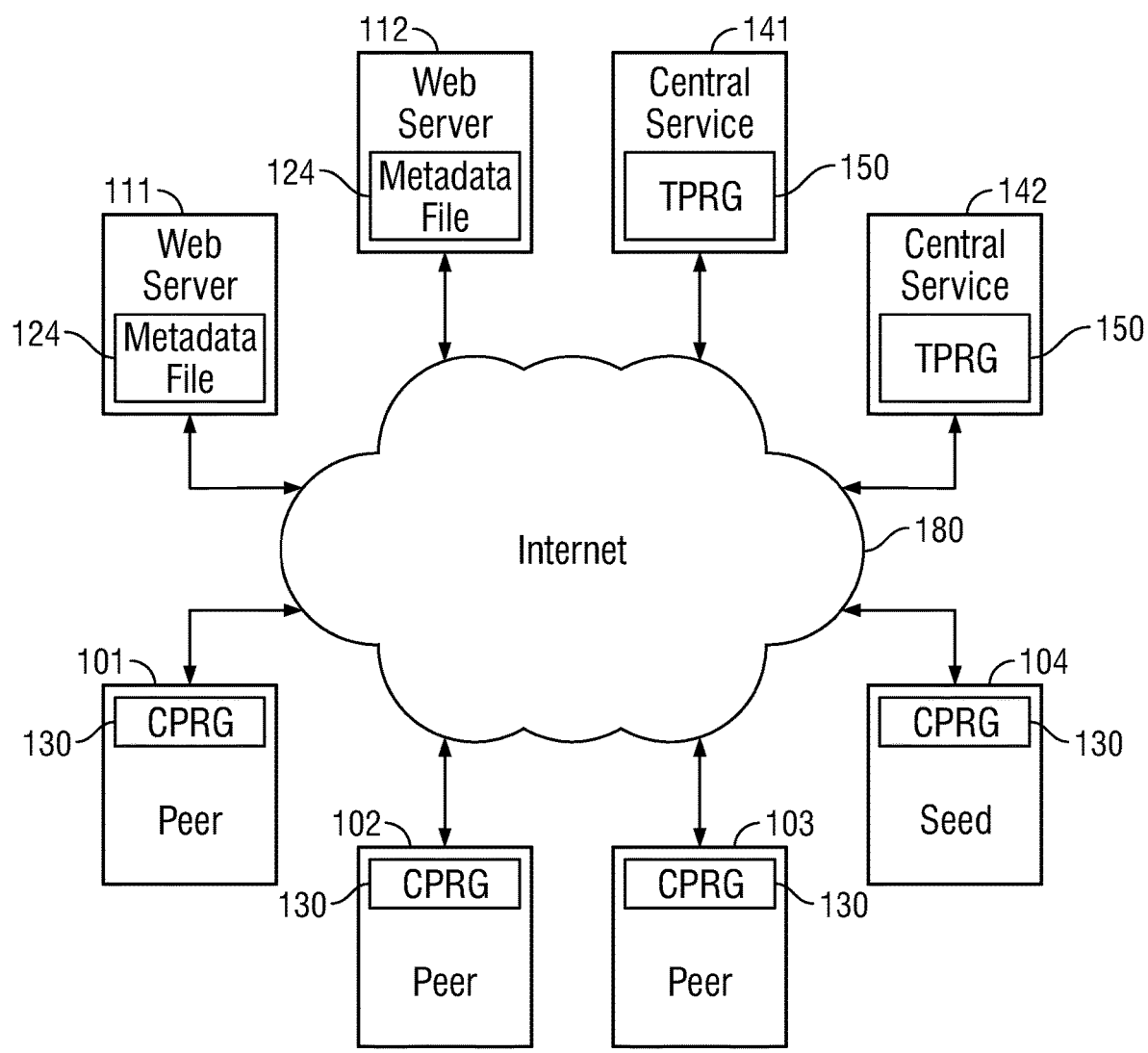
FIG. 1 shows a simplified example of a peer-to-peer network.

In some implementations a peer-to-peer network is provided which is better able to propagate files and other digital content items from seed nodes to leech nodes in a more rapid manner. Rather than allowing individual leech nodes to pull digital content items from seed nodes that can most rapidly send the requested objects as in conventional networks, the peer-to-peer network inverts this dissemination model by having seed nodes determine which leech nodes are to be given preferential treatment relative to other nodes. For instance, the seed node may allocate greater network resources to deliver digital content items to leech nodes which themselves allocate greater network resources to uploading and disseminating objects over the peer-to-peer network. In one particular implementation, for example, the seed node may upload digital content items for delivery to a leech node at a rate proportional to the network connection speed of the leech node. In this way leech nodes with faster network connections will more quickly receive the digital content items they request relative to leech nodes with slower network connections, thereby allowing these digital content items to be further disseminated throughout the peer-to-peer network by the leech nodes at a more rapid rate.

By configuring a peer-to-peer network to operate in the aforementioned manner, seed nodes can select those leech nodes which will be most able to benefit the entire swarm of nodes which are attempting to share one or more digital content items rather than just benefiting the individual leech nodes at the expense of the swarm. In this way the overall health of the swarm outweighs the satisfaction of any individual leech node's request.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

A common method for transferring digital content over the Internet employs content delivery networks (CDNs). CDNs are networks of computer systems physically dispersed throughout a geographical region configured to store and provide digital content to participants in some optimal manner. For example, when optimizing for performance, participants may be directed to CDN computer systems that are physically, geographically near to them so that content undergoes the fewest hops. Accordingly, when a participant requests to view a web page or other content, at least some of the web page's content may be provided by a geographically close CDN computer. If one CDN computer system becomes overburdened, load balancing techniques may be implemented to share loads across other nodes of the CDN. Participants may communicate with other participants by sending feedback and other information.

CDNs are commonly designed to improve perceived performance to a participant in the form of faster and larger content delivery and availability. CDN content servers can be deployed in multiple global locations, often over multiple backbones and Internet service providers (ISPs). Content servers are designed to cooperate with each other to meet the needs of participants, often transparently moving content between content servers in the CDN in order to improve distribution based on participant.

One alternative to the CDN model for transferring digital content is the peer-to-peer model in which nodes (e.g., peers) participating in a peer-to-peer network provide resources as well as use them. This means that unlike CDNs, the content serving capacity of peer-to-peer networks can actually increase as more participants begin to access the content. This property can be a significant advantage of peer-to-peer networks over CDNs.

Peer-to-peer networks can achieve better scaling by utilizing the upload capacities of the nodes to redistribute a digital content item, or portions thereof, to other nodes and/or by utilizing the download capacity of the nodes (e.g., for tracking the reception status of the content among the nodes.) Additionally, the allocation of network bandwidth may be delegated to the respective nodes, thereby distributing the computing power across the nodes of the network and correlating such allocations with locally detected network capacities. These strategies extend the use of network resources to achieve a faster distribution of the digital content, and the delegation of allocation may yield significant improvements as the number of nodes and the number of digital content items exchanged there among scales.

There are at least three architectural approaches to peer-to-peer resource sharing systems: peer-to-peer with centralized control, pure peer-to-peer with no centralized control and a hybrid approach that incorporates some of the aspects of the other two. In a peer-to-peer system with a centralized controller, a central server or control node maintains a list of connected peers. Every peer connects to the central server, which scans the peers' disks for shared resources and maintains directories and indexes of the shared resources. In a pure peer-to-peer system that does away with the central server, each peer continuously keeps track of other peers by pinging known peers in the system.

FIG. 1 presents a simplified example of the operation of an illustrative peer-to-peer network. Of course, although the methods described herein are generally applicable to all such peer-to-peer networks supporting the sharing of digital content items by peers, the protocol presented in connection with FIG. 1 is used in the following description only for illustrative purposes. However, the subject matter disclosed herein is equally applicable to other swarm and peer-to-peer networks, both decentralized and centralized.

In a peer-to-peer network, a data content item (e.g., files, database records, objects, etc.) is to be sent by one or more "seed" nodes (or simply "seeds") or partial seed nodes. A seed node stores a complete copy of the data content item and each partial seed node contains a copy of a portion of the data content item. The seed or partial seed node (both of which are referred to hereinafter as simply a "seed") is to send all or part of the digital content item to a set of "leech" nodes (or simply "leeches"), each of which stores less than a full copy of the digital content item. In order to deliver the digital content item to the leech nodes, the digital content item is divided into chunks, which may be selected, e.g., based on size, utility, an arbitrary "chunking" algorithm, etc. Moreover, the nodes of the peer-to-peer network are fully interconnected, such that any node may contact any other node over the network. The interconnected nodes of the peer-to-peer network may therefore cooperate to exchange chunks of the digital content item by storing chunks received from some nodes, and by redistributing chunks to other nodes.

The particular method by which nodes in a peer-to-peer network connect with each other may vary with the type of peer-to-peer network. After a connection has been established, the nodes may also exchange connection speeds which describe the speed of the network connection that is being used by the respective node. Additionally, network speeds can be dynamically assessed, for example through coordination between two peers, for instance, temporarily limiting the upload or download process to only the other peer to determine the maximum speed, after which ongoing transfers may be resumed. It should be re-emphasized, however, that the present invention can be implemented on a variety of peer-to-peer networks and is not limited by any particular peer-to-peer protocol.

In the example of the peer-to-peer network shown in FIG. 1, one or more servers, such as servers 111 and 112, serve as depositories of a file often referred to as a metadata file (MFILE) 124. The metadata file 124 contains metadata concerning a digital content item that is to be shared among peers 101-104. The metadata file 124 may contain information such as the URL of a central service node (described below), suggested names for the individual chunks of the digital content item to be delivered, the chunk length used, and a hash code for each block, which peers can use to verify the integrity of the data they receive. Users of the peers 101-104 first download the metadata file 124 before accessing the desired digital content item. The appropriate metadata file 124 may be located by the user in any conventional manner. For example, the user may already know the web addresses of one or more of the servers 111 and 112 so that they can contact them directly to download the metadata file 124, or the user may be linked to the metadata file 124 through a web page, or they may otherwise find the metadata file 124 by searching for it using an Internet search engine.

Each of the peers 101-104 is configured with a client version of a file sharing program (CPRG) 130. The file sharing program 130 is used to download and open the metadata file 124. The file sharing program 130 may display for the user one or more coordinating nodes, referred to as a central service node, such as central service nodes 141 and 142, which match peers that want digital content with peers that have the digital content. The central service node does not have any knowledge of the contents of the digital content items being distributed, and therefore a large number of peers can be supported with a relatively limited bandwidth. The central service node maintains lists of peers currently participating in the file sharing process for the desired digital content item. The file sharing program 130 then establishes communication with the central service node and sends the file sharing program 130 a list of other peers, which may act as seeds and currently have some of the chunks of the digital content item that the peers 101-104, acting as leeches, desire.

As an example, if peers 101 and 102 establish communication with central service node 141, their respective file sharing programs 130 contact and communicate with the coordinating program 150 of the central service node 141. The coordinating program 150 then sends a network list back to each of the connecting peers 101 and 102. Included in the network list is contact information for at least one peer, such as peer 104, which may act as a seed and which has zero or more chunks of the digital content item that the peers 101 and 102, acting as leeches, wish to procure. The network list may also include contact information for other peers that have recently contacted the central service node 141 regarding the digital content item. The peer programs 130 of peers 101 and 102 then use the information in the provided network list to establish peer-to-peer communications with the peer 104 and with one another in order to download the digital content items. Such a group of peers connected to each other to share digital content is often called a swarm. If the swarm contains only the initial seeder, the peer connects directly to it and begins to request chunks. As peers enter the swarm, they begin to trade chunks with one another, instead of downloading directly from the initial seed.

Initially, the peer 104 may be the only peer in the peer-to-peer network that has any of the chunks available for delivery. When a chunk is successfully downloaded to one of the peers, however, the file sharing program 130 of that peer announces to other peers that it now has a chunk available for downloading. As more peers join the peer-to-peer network along with the peers 101 and 102, this will further serve to speed up the distribution of the complete digital content item to all other peers as they participate in the swarm download. Eventually, all of the chunks of the media content item may be available within the peer-to-peer network from peers other than the peer 104. At that time, the peer 104 may disconnect itself from the peer-to-peer network.

Before announcing the availability of an assembled chunk that has been downloaded, the file sharing program 130 will generally first verify that the assembled chunk is good. It does this, for example, by calculating a hash value for the assembled chunk and comparing the calculated hash value against a known hash value provided, for example, in the metadata file 124. If the two hash values match, then the chunk is determined to be good. In this case, the other peers are notified by the file sharing program 130 of the assembled chunk's availability for downloading. On the other hand, if the two hash values do not match, then the chunk is determined to be corrupted. In this case, the individual chunks for that assembled chunk are discarded and requested again from the same or different sources (i.e., other peers on the peer-to-peer network).

As leeches successfully download all chunks of the digital content item, they may disconnect from the peer-to-peer network. At the same time, other leeches may be joining the peer-to-peer network to download the digital content item from remaining peers in the network. In order to be notified of such newly joining peers, as well as to maintain its own contact information in the network list, it is useful for a peer already participating in a swarm download to periodically re-connect to the central service node and obtain an updated network list.

Figure 2:
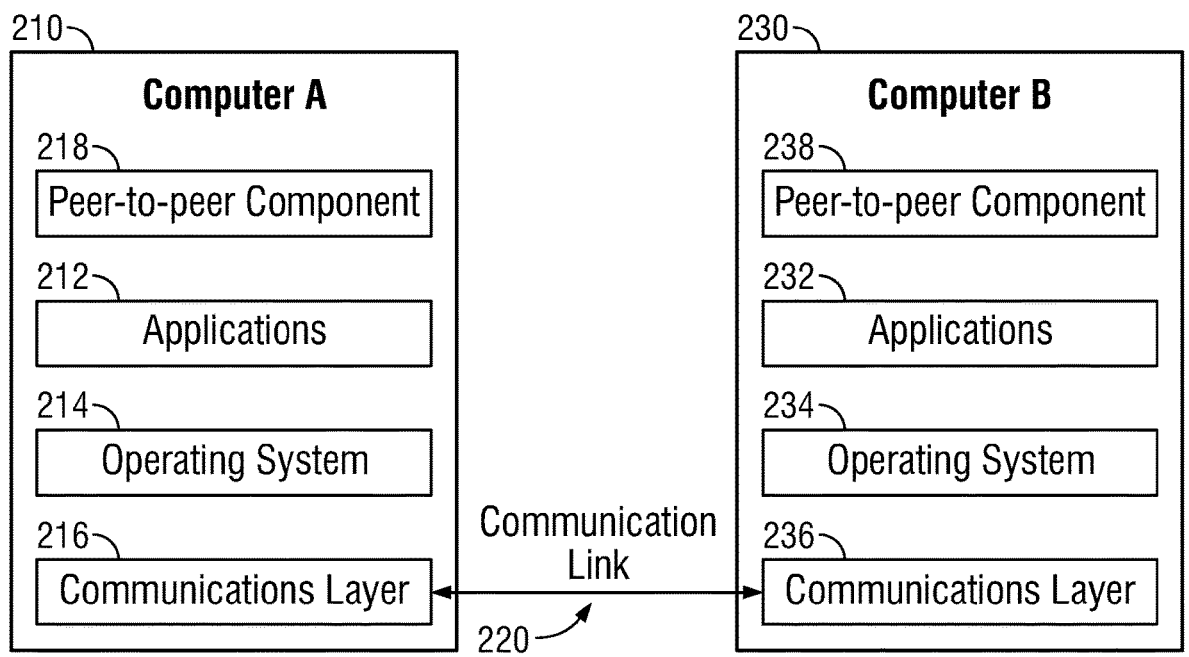
FIG. 2 is a block diagram of one example of the components within two nodes of a peer-to-peer network.

With reference now to FIG. 2, a block diagram depicts one example of the components within two computers that are operating as nodes within a peer-to-peer network. Users of computers 210 and 230 can employ browsers and other networked applications, such as a peer-to-peer file sharing application, to send and receive information across a network, which may include the Internet in one example. Computer 210 has network-enabled applications 212 that use operating system 214 for various services, such as network communication services provided by communications layer 216. In addition, peer-to-peer component 218 may be a stand-alone applet or an application that provides peer-to-peer networking functionality to computer 210. Communication link 220 supports data traffic between computer 210 and computer 230, which has components that correspond to those shown in computer 210: applications 232, operating system 234, communications layer 236, and peer-to-peer component 238. Peer-to-peer components 218 and 238 may provide support for a distributed, peer-to-peer file sharing function, as shown in more detail in FIG. 3.

Figure 3:
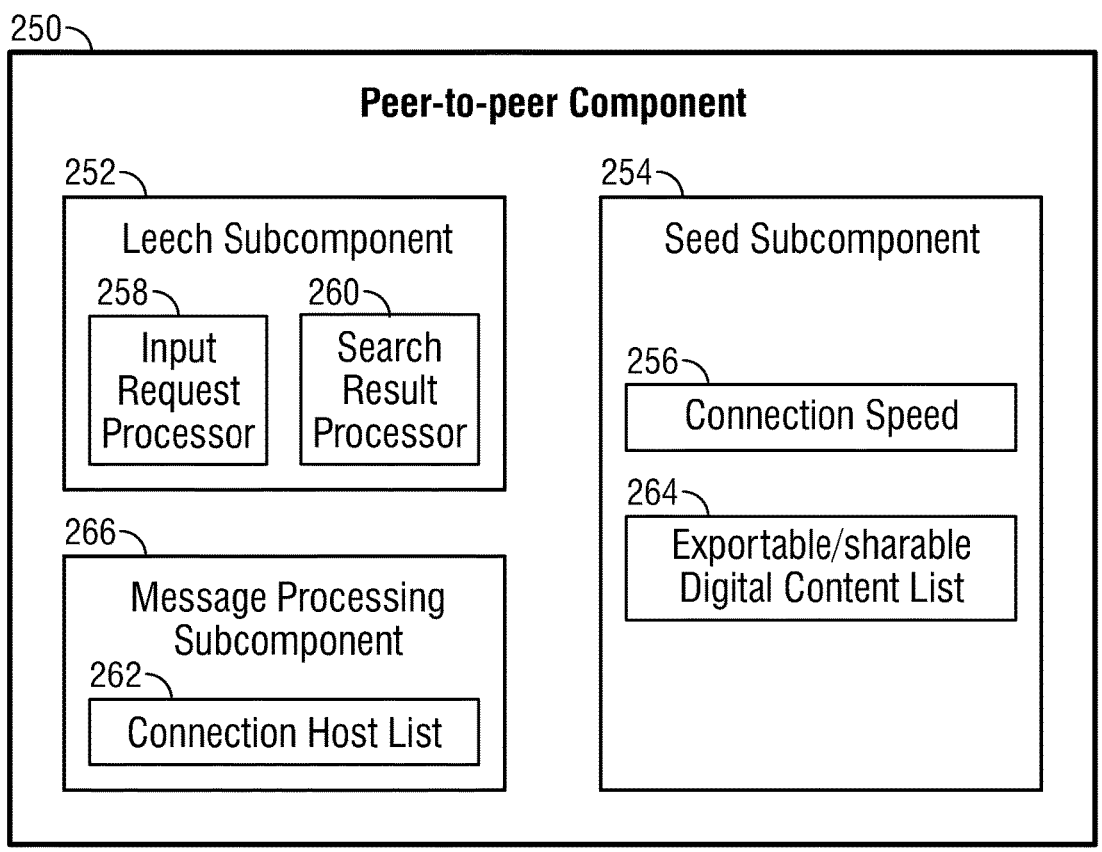
FIG. 3 is a block diagram depicting illustrative subcomponents within a peer-to-peer component that contain file sharing functionality.

With reference now to FIG. 3, a block diagram depicts illustrative subcomponents within a peer-to-peer component 250 that contains file sharing functionality. As noted previously, in peer-to-peer networks, each computer platform, or node, generally has both leech functionality for initiating outgoing connections to request digital data and seed functionality to accept incoming connections and send digital data.

In particular, peer-to-peer component 250 contains leech subcomponent 252 and seed subcomponent 254. Of course, the subject matter of the present disclosure is not limited by any particular implementation and the particular peer-to-peer component shown herein is presented for illustrative purposes only.

Leech subcomponent 252 contains input request processor 258 and search result processor 260. When a user at a node enters an input request for a particular file, the request is copied to a list of peer nodes to which the node is connected. When a node receives a request for a file or other digital content item, its seed component, such as seed component 254, processes the request. Each peer node searches its own databases in an attempt to satisfy the search request. Alternatively, a user may have previously specified a list of digital content items that the user is willing to export or share, such as digital content item list 264, and the seed subcomponent 254 searches this list to find one or more digital content items that satisfy the search query. Alternatively, rather than searching through a list of names, the seed subcomponent 254 may search the node's permanent storage for content that matches the input request. Depending on certain parameters within the request message, the node also forwards the request, e.g., by using message processing subcomponent 266, to each node in its list of connected peer nodes. If a resulting hit is made, then the node returns the results to the peer node that contacted it or to the originating node. In this manner, the search for the requested digital content item fans out amongst a large number of nodes.

The seed subcomponent 254 shown in FIG. 3 also includes a connection speed component 256, which as noted above, allows the peer-to-peer node to exchange connection speeds or other measures of their respective capacities to upload data for sharing over the peer-to-peer network.

In typical peer-to-peer environments, leech nodes take a peer centric view of the network, attempting to acquire data as quickly as possible for themselves. In other words, leeches attempt to leech data as quickly as possible. This typical approach allows peer nodes to be treated equally by the seed nodes sending digital content items and/or chunks of digital content items to the leeches. However, the goal of a peer-to-peer network is to disseminate digital content items to as many peers as quickly as possible. To achieve faster dissemination rates, in accordance with the methods, systems and devices shown herein, the typical dissemination model is inverted.

More particularly, in accordance with the methods, systems and devices shown herein, the dissemination model is changed to discriminate against leeches that have a relatively low capacity for uploading data. That is, faster leeches with faster data rates are given preferential treatment by seeds over slower leeches with slower data rates. This model ensures that leeches having a greater capacity for uploading digital content items will be able to acquire content more quickly and, in turn, allow them to share that content more quickly.

By allowing the seeds and/or a central service (e.g., central service nodes 141 and 142) to allocate relatively more network resources to leeches with the greatest data rates or bandwidth, rather than allowing leeches to pull the digital content items from one or more seeds at a rate of their choosing, the digital content items can be propagated throughout the network at a faster rate than would otherwise be possible. Thus, optimization is performed by the seeds and/or the central service, not by the individual leeches.

The network resources available to the seeds for allocation to the leeches are typically the number of simultaneous connections they can make to different leeches and the total bandwidth available for distributing data over those connections. These resources can be allocated in different ways depending on the particular implementation.

By way of example, assume that in one particular pure peer-to-peer implementation a seed node has 10 connections available over which it can distribute digital content items to leeches. The first 10 leeches who request a digital content item will be served, assuming sufficient bandwidth is available to the seed. If, however, an 11th leech requests a digital content item, the seed needs to determine which of the 11 leeches should be served. In one implementation, the seed gives preferential treatment to the top 10 leeches that have the greatest bandwidth available to them. Accordingly, if the $11^{th}$ leech is not the slowest in the set, this implementation will result in the termination of network resource allocation to the slowest of the 10 leeches currently being served, thereby allowing the new 11th leech to be served.

On the other hand, if the seed does not have sufficient bandwidth available to serve the first 10 leeches, the seed will distribute digital content items and/or chunks of digital content items to the leeches with the greatest data rates until the bandwidth available to the seed is fully utilized. Thus, if, for example, only the two fastest leeches can be served without exceeding the bandwidth limitations of the seed, then the seed will only use two of its available connections, leaving the other 8 connections unused.

Figure 4:
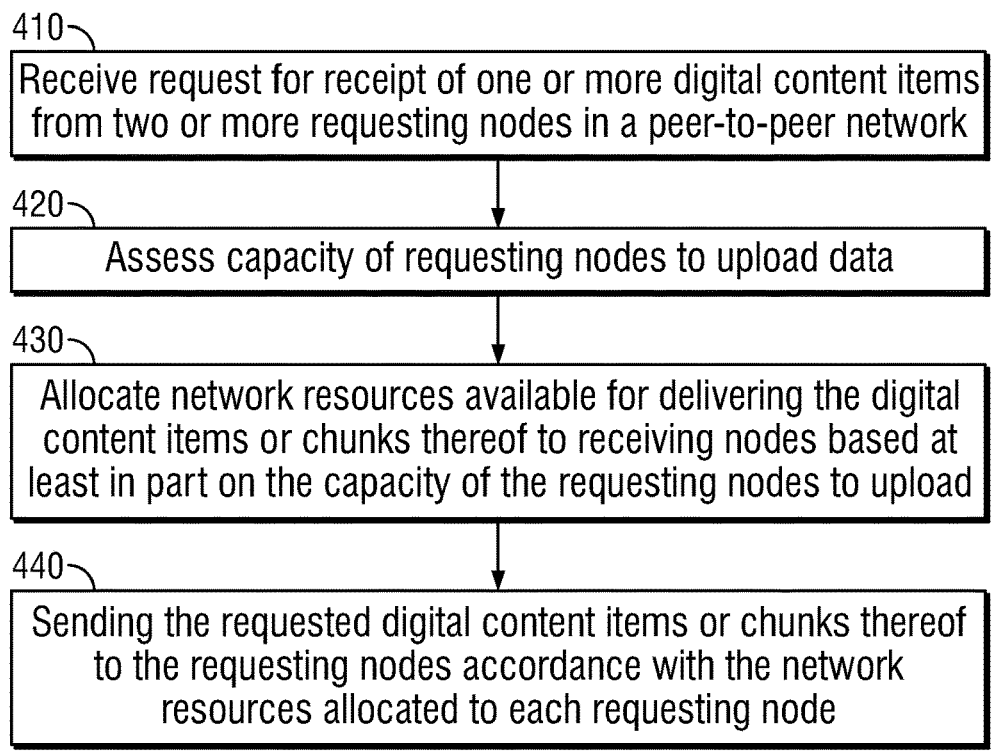
FIG. 4 is a flowchart showing one example of a method that may be employed by a seed node and/or a central control node to facilitate the transferring of objects in a peer-to-peer network.

FIG. 4 is a flowchart showing one example of a method that may be employed by a seed node and/or a central service node to facilitate the transferring of digital content items in a peer-to-peer network in which two or more nodes participate. The method begins at block 410 when a request is received for receipt of one or more digital content items from two or more requesting nodes belonging to the peer-to-peer network. In response to the request, the capability of the requesting nodes to upload data is assessed at block 420. In some cases this information, in the form of the network connection speed, for example, may be included in the initial request received from the requesting node. In other cases the seed node or the central service node may request this information from the requesting node. At block 430, network resources available to the peer-to-peer network are allocated for delivering the digital content items or chunks thereof to the receiving nodes based at least in part on the capacity of the requesting nodes to upload data. The network resources that are allocated may include the bandwidth available to the seed node for uploading data. Finally, at block 440 the digital content items or chunks thereof are sent to the requesting nodes over the peer-to-peer network in accordance with the network resources that are allocated to each of the requesting nodes.

Figure 5:
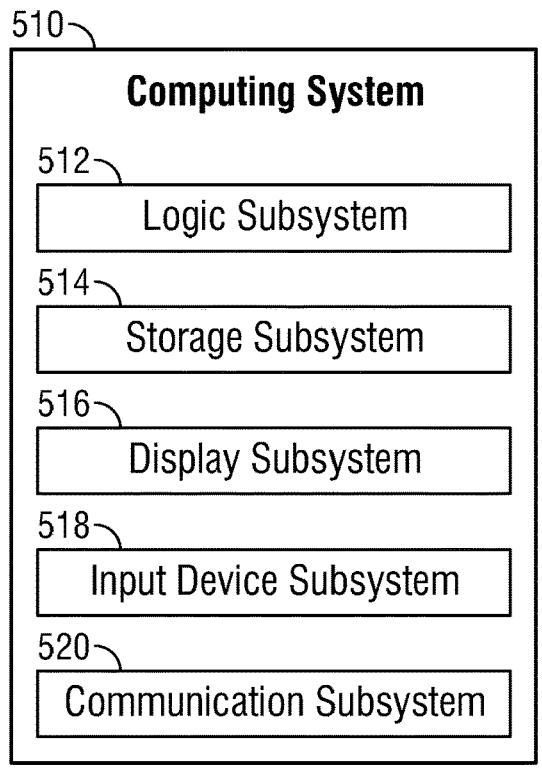
FIG. 5 shows one example of a computing system that may perform one or more of the above described methods and processes.

FIG. 5 schematically shows a non-limiting computing system 510 that may perform one or more of the above described methods and processes. Computing system 510 is shown in simplified form. It is to be understood that virtually any computer architecture may be used without departing from the scope of this disclosure. In different embodiments, computing system 510 may take the form of a mainframe computer, server computer, desktop computer, laptop computer, tablet computer, home entertainment computer, network computing device, mobile computing device, mobile communication device (e.g., smart phone), gaming device, etc.

Computing system 510 includes a logic subsystem 512 and a storage subsystem 514. Computing system 510 may optionally include a display subsystem 516, input device subsystem 518, communication subsystem 520, and/or other components not shown in FIG. 5. Computing system 510 may also optionally include or interface with user input devices such as keyboards, mice, game controllers, cameras, microphones, and/or touch screens, for example. These user input devices may form part of input device subsystem 518 or may interface with input device subsystem 518.

Logic subsystem 512 includes one or more physical devices configured to execute one or more instructions. For example, the logic subsystem may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 514 includes computer-readable storage media such as one or more physical, non-transitory, devices configured to hold data and/or instructions executable by the logic subsystem to implement the herein described methods and processes. When such methods and processes are implemented, the state of storage subsystem 514 may be transformed (e.g., to hold different data).

Storage subsystem 514 may include removable media and/or built-in devices. Storage subsystem 514 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 514 may include devices with one or more of the following characteristics: volatile, nonvolatile, dynamic, static, read/write, read-only, random access, sequential access, location addressable, file addressable, and content addressable. In some embodiments, logic subsystem 512 and storage subsystem 514 may be integrated into one or more common devices, such as an application specific integrated circuit or a system on a chip.

The terms "module," "program," and "component" may be used to describe an aspect of computing system 510 that is implemented to perform one or more particular functions. In some cases, such a module, program, or component may be instantiated via logic subsystem 512 executing instructions held by storage subsystem 514. It is to be understood that different modules, programs, and/or components may be instantiated from the same application, service, code block, object, library, routine, API, function, etc. Likewise, the same module, program, and/or component may be instantiated by different applications, services, code blocks, objects, routines, APIs, functions, etc. The terms "module," "program," and "component" are meant to encompass individual or groups of executable files, data files, libraries, drivers, scripts, database records, etc.

When included, display subsystem 516 may be used to present a visual representation of data held by storage subsystem 514. This visual representation may take the form of a graphical user interface (GUI). As the herein described methods and processes change the data held by the storage subsystem, and thus transform the state of the storage subsystem, the state of display subsystem 516 may likewise be transformed to visually represent changes in the underlying data. Display subsystem 516 may include one or more display devices utilizing virtually any type of technology. Such display devices may be combined with logic subsystem 512 and/or storage subsystem 514 in a shared enclosure, or such display devices may be peripheral display devices.

When included, communication subsystem 520 may be configured to communicatively couple computing system 510 with one or more other computing devices. Communication subsystem 520 may include wired and/or wireless communication devices compatible with one or more different communication protocols. As non-limiting examples, the communication subsystem may be configured for communication via a wireless telephone network, a wireless local area network, a wired local area network, a wireless wide area network, a wired wide area network, etc. In some embodiments, the communication subsystem may allow computing system 510 to send and/or receive messages to and/or from other devices via a network such as the Internet.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

The invention claimed is:

1. A method for transferring digital content items in a peer-to-peer network in which a plurality of nodes participate, comprising:
   receiving requests for receipt of one or more digital content items from a plurality of requesting nodes belonging to the peer-to-peer network;
   ranking respective network data rates of the plurality of requesting nodes from a requesting node with a fastest data rate to a requesting node with a slowest data rate;
   determining network resources of a sending node that are available to the peer-to-peer network for uploading the one or more digital content items or chunks thereof to the plurality of requesting nodes;
   based on the network resources available and by the ranking order of the respective network data rates of the plurality of requesting nodes, selecting one or more requesting nodes until the network resources of the sending node are depleted, wherein the requesting node with the fastest data rate is selected first; and
   uploading the one or more digital content items or chunks thereof to the selected one or more requesting nodes.

2. The method of claim 1 in which the network resources determine a rate at which the one or more digital content items or chunks thereof are sent to the selected requesting nodes.

3. The method of claim 1 in which the sending node is a seed node containing all chunks associated with the one or more digital content items.

4. The method of claim 1 further comprising receiving the requests by a central service node associated with the peer-to-peer network.

5. The method of claim 4 further comprising assessing a capacity of each of the plurality of requesting nodes using the central service node and allocating the network resources using the central service node.

6. One or more computer-readable storage devices comprising computer-executable instructions which, when executed by a first node, cause the first node to perform a method for transferring digital content items or chunks thereof in a peer-to-peer network in which a plurality of nodes participate, comprising:
   receiving requests for receipt of one or more digital content items from a plurality of requesting nodes belonging to the peer-to-peer network;
   ranking respective network data rates of the plurality of requesting nodes from a requesting node with a fastest data rate to a requesting node with a slowest data rate;
   determining network resources of the first node that are available to the peer-to-peer network for uploading the one or more digital content items or chunks thereof to the plurality of requesting nodes based on the network resources available and by the ranking order of the respective network data rates of the plurality of requesting nodes, selecting one or more requesting nodes until the network resources of the first node are depleted, wherein the requesting node with the fastest data rate is selected first; and
   uploading the one or more digital content items or chunks thereof to the selected one or more requesting nodes.

7. The computer-readable storage devices of claim 6 in which the first node is a seed node containing all chunks associated with the one or more digital content items.

8. The computer-readable storage devices of claim 6 in which the first node is a central service node associated with the peer-to-peer network.

9. The computer-readable storage devices of claim 8 wherein each node is configured with a file sharing program for displaying the central service node.

10. A node in a peer-to-peer network comprising a plurality of peer nodes, comprising:
one or more computer-readable storage media;
a processor; and
programming logic which, when executed by the processor, is configured to:
receive requests for receipt of one or more digital content items from a plurality of requesting nodes belonging to the peer-to-peer network;
rank respective network connection speeds of the plurality of requesting nodes from a requesting node with a fastest data rate to a requesting node with a slowest connection speed;
determine network resources of the node that are available to the peer-to-peer network for uploading the digital content items or chunks thereof to the plurality of requesting nodes based on the network resources available and by the ranking order of the respective network data rates of the plurality of requesting nodes, select one or more requesting nodes until the network resources of the node are depleted, wherein the requesting node with the fastest data rate is selected first; and
upload the one or more digital content items or chunks thereof to the selected one or more requesting nodes.

11. The node of claim 10 wherein the programming logic is further configured to allocate network resources based upon the selected requesting nodes.

12. The node of claim 10 wherein the node is a central service node associated with the peer-to-peer network.

13. The node of claim 12 wherein each node is configured with a file sharing program for displaying the central service node.

14. The node of claim 10 wherein the programming logic is further configured to:
receive a request from at least one of the plurality of peer nodes for an updated network list; and
transmit the updated network list to the at least one peer node, wherein the updated network list includes peers that newly-joined the peer-to-peer network.

15. The method of claim 1 wherein the network resources of the sending node comprise at least one of 1) a number of simultaneous connections that are available to the sending node for uploading the one or more digital content items or chunks thereof to the plurality of requesting nodes and 2) an amount of total bandwidth available to the sending node.

16. The method of claim 1 wherein the network resources of the sending node are depleted when a number of received requests exceeds a number of simultaneous connections available or an amount of total bandwidth available to the sending node is less than a bandwidth required to fulfill the received requests.

17. The computer-readable storage devices of claim 6 wherein the network resources of the sending node comprise at least one of 1) a number of simultaneous connections that are available to the sending node for uploading the one or more digital content items or chunks thereof to the plurality of requesting nodes and 2) an amount of total bandwidth available to the sending node.

18. The computer-readable storage devices of claim 6 wherein the network resources of the node are depleted when a number of received requests exceeds a number of simultaneous connections available or an amount of total bandwidth available to the node is less than a bandwidth required to fulfill the received requests.

19. The node of claim 10 wherein the network resources of the node comprise at least one of 1) a number of simultaneous connections that are available to the node for uploading the one or more digital content items or chunks thereof to the plurality of requesting nodes and 2) an amount of total bandwidth available to the node.

20. The node of claim 10 wherein the network resources of the node are depleted when a number of received requests exceeds a number of simultaneous connections available or an amount of total bandwidth available to the node is less than a bandwidth required to fulfill the received requests.

* * * * *